Feb. 26, 1924.

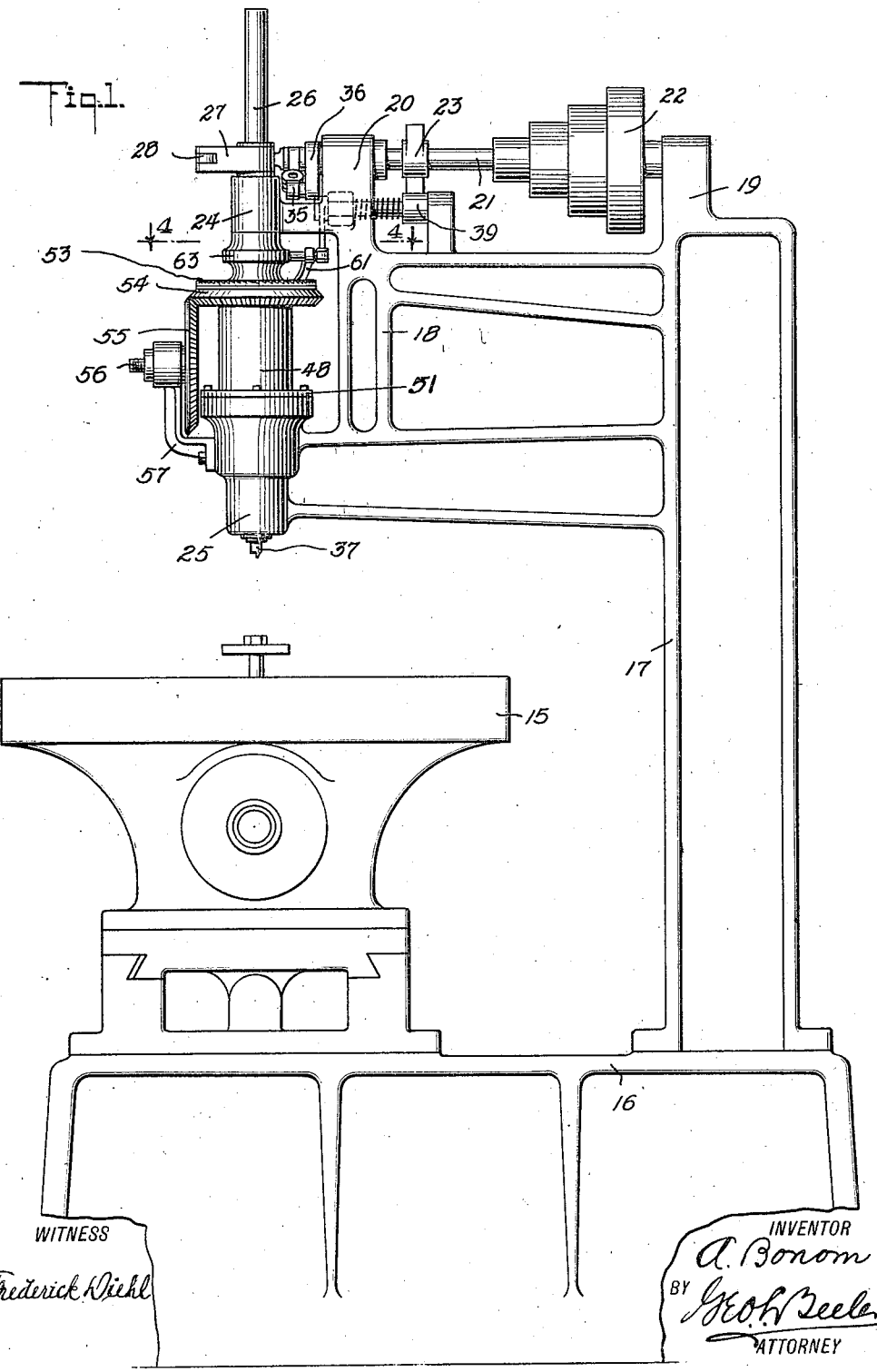

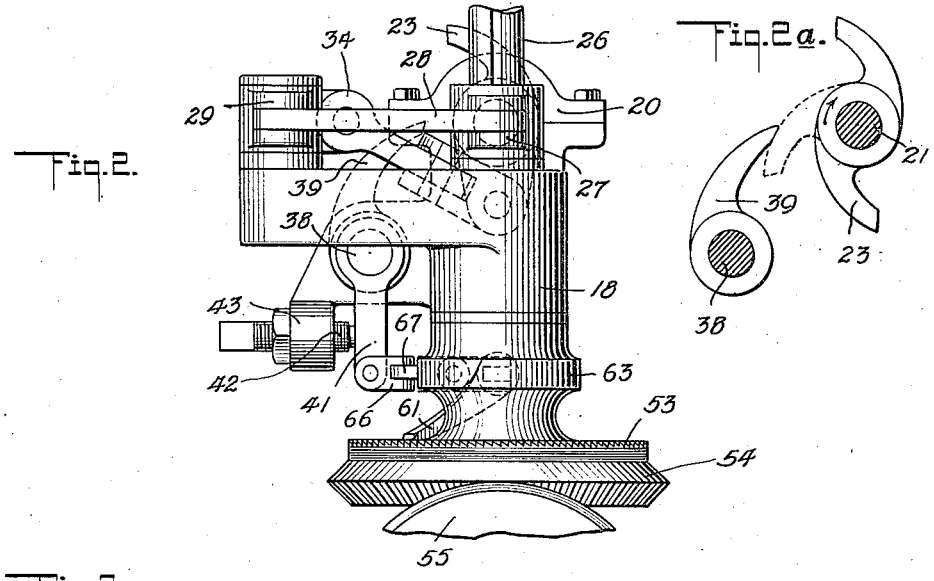
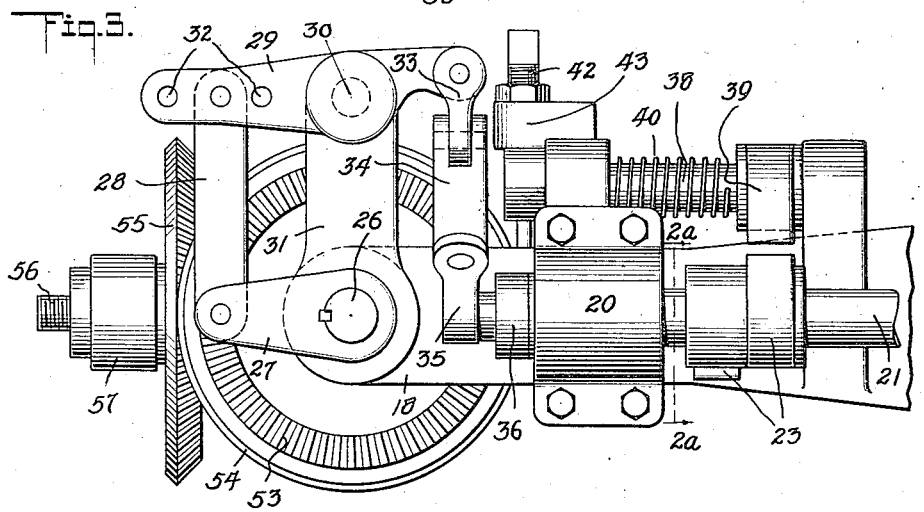
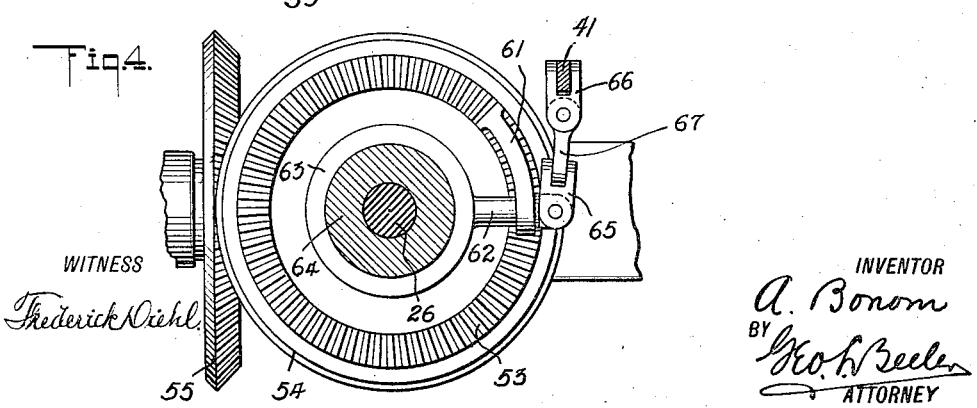

A. BONOM

OSCILLATORY ARC SHAPER

Filed Aug. 2, 1921    5 Sheets-Sheet 3

1,485,162

WITNESS
Frederick Diehl.

INVENTOR
A. Bonom
BY Geo. L. Beeler
ATTORNEY

Feb. 26, 1924.
1,485,162
A. BONOM
OSCILLATORY ARC SHAPER
Filed Aug. 2. 1921
5 Sheets-Sheet 4

WITNESSES
Frederick Diehl.

INVENTOR
A. Bonom
BY Geo. L. Beeler
ATTORNEY

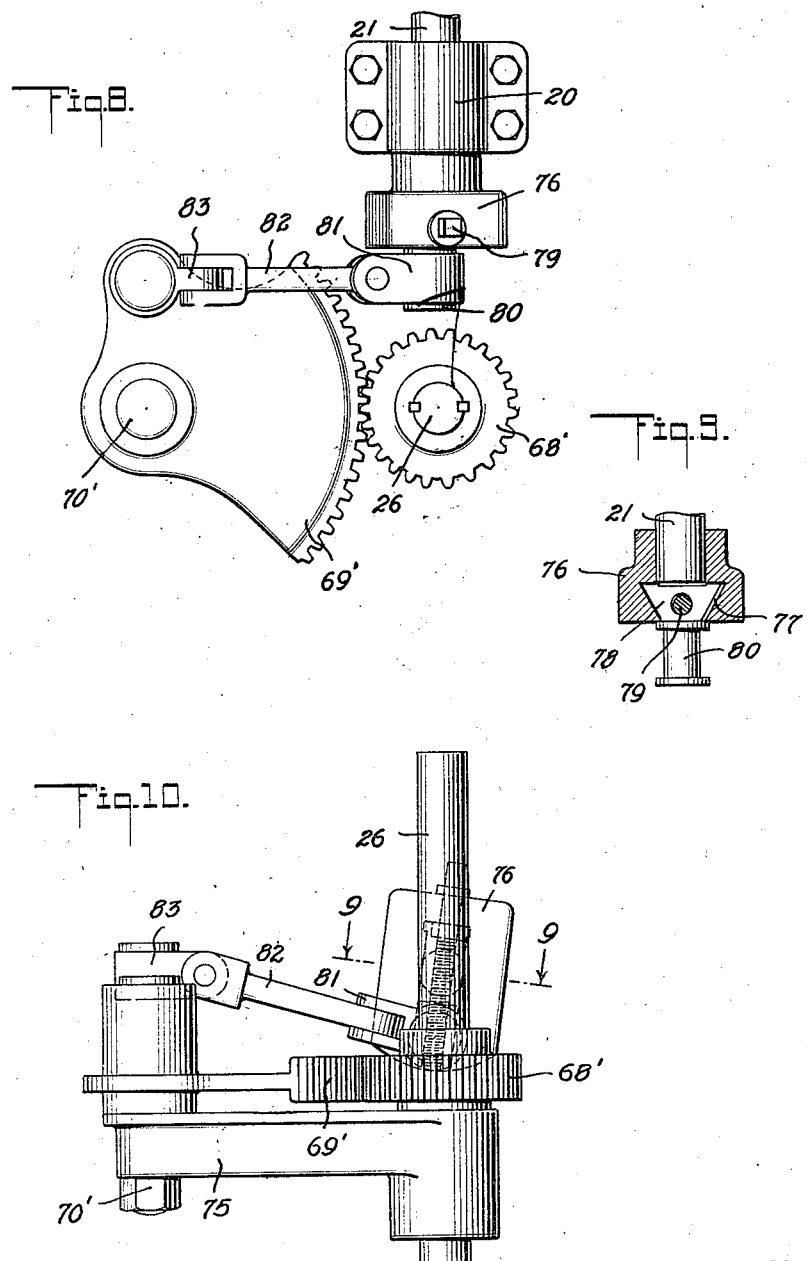

Patented Feb. 26, 1924.

1,485,162

UNITED STATES PATENT OFFICE.

ALFRED BONOM, OF MONTREAL, QUEBEC, CANADA.

OSCILLATORY ARC SHAPER.

Application filed August 2, 1921. Serial No. 489,344.

*To all whom it may concern:*

Be it known that I, ALFRED BONOM, a citizen of Italy, residing at Montreal, in the Province of Quebec and Dominion of Canada, have invented certain new and useful Improvements in Oscillatory Arc Shapers, of which the following is a specification.

This invention relates to metal working machinery, and has particular reference to shapers or machines for cutting, channeling, or reducing metal in various ways.

One object of this invention is to provide machines for the purpose of reducing metal in the form of a circular arc or a series of such arcs, and especially to provide a machine employed by me in the building of high speed rotary steam turbines in which there are involved a multiplicity of rotor disks each having on at least one face several concentric circular series of buckets, the buckets of each series being arranged in a somewhat radial position, though in fact they are preferably curved, and of a length approximately from one-half inch to one inch more or less. These buckets are arranged in close circumferential succession and spaced but slightly from one another by reason of slots formed between them. Hence they are formed in practice by the action of a routing or shaping tool caused to oscillate through relatively small arcs of circles around the axis of the cutter. The cutter may be thought of as of tubular cylindrical form having a chisel-like cutter at one end. In the practice of this invention and from what has been stated above, it will be understood that the cutting tool must be limited to oscillations in short arcs, rather than to operate circularly, because a circular cutter would intersect and so destroy previously formed slots.

A further object of this invention is to provide an oscillatory cutter or shaper that is most rapid and efficient and one that may be controlled, with respect to the length of the arc of operation, with the utmost precision.

A further object of the invention is to provide improved means for controlling the feed of the cutting tool which after being once determined for any job will be entirely automatic.

With the foregoing and other objects in view, but without unnecessarily restricting the scope of the invention with respect to design of the machine, materials, or the like, reference is had to the accompanying drawings in which similar parts are referred to by like reference characters, and in which—

Figure 1 is a side elevation.

Fig. 2 is a front elevation of the head portion of Fig. 1, and Fig. 2ª is a detail on the line 2ª—2ª of Fig. 3.

Fig. 3 is an enlarged plan view of the head portion of Fig. 1.

Fig. 4 is a horizontal section on the line 4—4 of Fig. 1.

Fig. 8 is a plan view of a further modification.

Fig. 9 is a sectional detail on the line 9—9 of Fig. 10.

Fig. 10 is a front elevation of the mechanism of Fig. 8.

Figure 5:
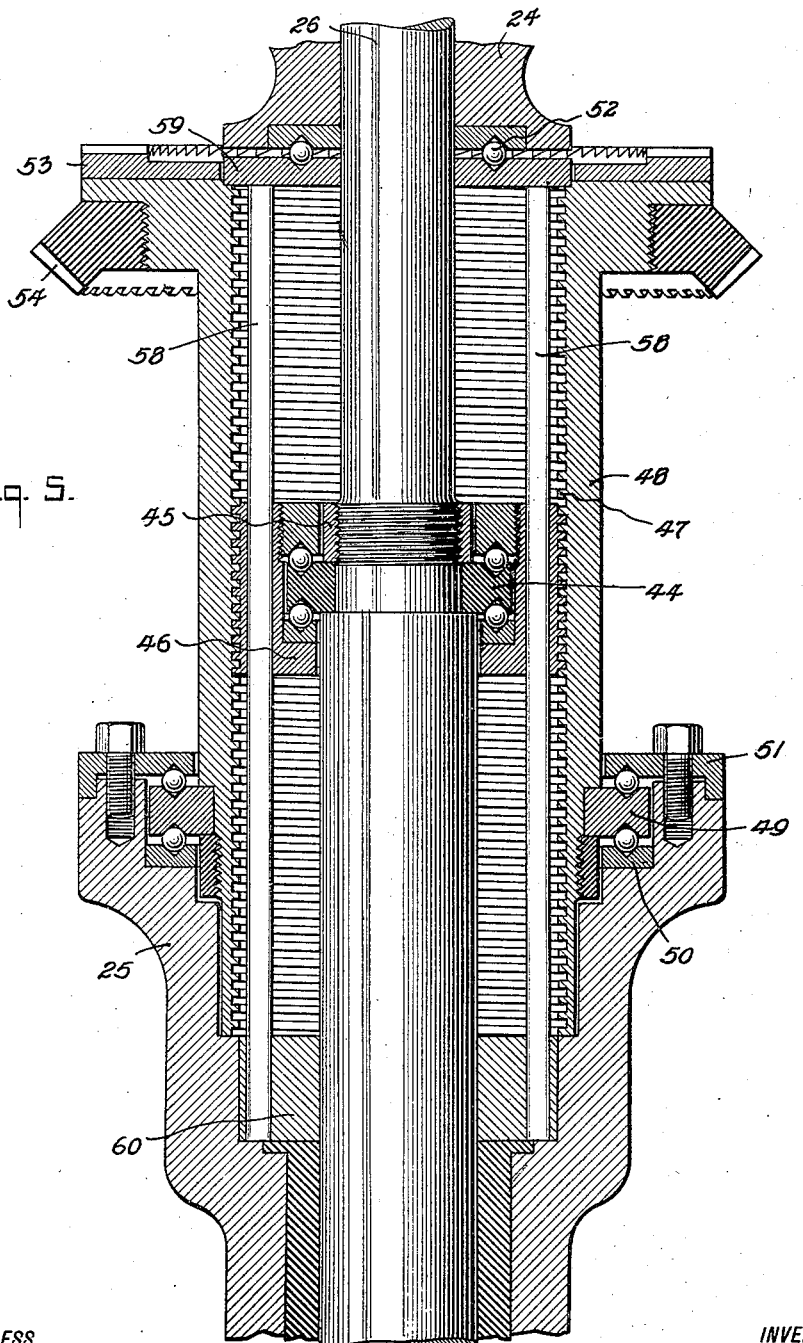
Fig. 5 is a vertical section of the feed mechanism.

Referring now more specifically to the drawings, I show a practical machine comprising a work holding bed 15, adjustable by any suitable means upon a base 16, from which extends upward a standard 17, having a laterally projecting frame or bracket 18. Journaled in bearings 19 and 20 in the upper part of the frame is a shaft 21 adapted for continuous rotation at any suitable speed and by any suitable means as for example through a cone pulley 22 fixed thereto. This shaft may be understood as being adapted for rotation in the direction of the arrow on Fig. 2ª, and fixed to the shaft is a cam 23 having one or two active faces.

The frame 18 is provided with two other bearings 24 and 25 whose common axis is at right angles to the axis of the shaft 21 and preferably in the same plane. Mounted for oscillatory movement as well as vertical reciprocation in the bearings 24 and 25 is the tool spindle 26. This spindle is reciprocated or fed toward the work by means depending for its operation upon the cam 23, and the cutting oscillations of the spindle are caused more directly from the rotation of the shaft 21.

Any suitable means may be provided to effect these various functions, but I will first describe the means shown in the first set of figures for oscillating the spindle. For the rotation of the spindle but without interfering with its vertical reciprocations, I show an arm 27 to the free end of which is pivoted a bar or link 28 whose other end has adjustable connection with a rocking lever 29 pivoted at 30 upon an extension 31 of the rigid frame 18. The adjustment of the link toward or from the pivot 30 is shown as by means of a series of holes 32 so as to vary the effective length of the lever 29 and correspondingly the throw of the arm 27. The lever 29 is of the first class, and pivoted to its opposite end is a clevis 33. A link 34 is connected at one end to this clevis and to its other end to another clevis 35 journaled upon the crank 36 fixed to the end of the shaft 21. For each rotation of the shaft therefore the rocking lever 29 will be given a complete movement on its pivot 30 and the arm 27 will be moved to and fro in an arc of a circle whose effective length will depend upon the throw of the lever 29. Consequently, the cutting tool 37 fixed to the lower end of the spindle will be similarly moved. By this means I secure a powerful cut because of the direct action from the power shaft 21 but moreover one which is as rapid as is expedient for the rotation of said shaft.

Journaled in the frame 18 parallel to the power shaft 21 is a rock shaft 38 to which is secured a tappet 39 adapted to be struck by the cam 23 whereby the rock shaft is turned partially in one direction against the force of a spring 40. Fixed to the same rock shaft is a finger 41 held normally against an adjustable stop 42 by virtue of the spring 40. The throw of the finger is thus variably limited by the adjustment of the stop 42 through the lug 43 constituting a part of the bracket.

The effective vertical position of the spindle 26 is determined by the means shown in Fig. 5 and including a collar 44 locked upon the spindle by means of a nut 45. The collar has anti-friction connection with a nut or runner 46 having peripheral threads cooperating with the internal threads 47 of a sleeve 48 surrounding the spindle and having anti-friction connections with the bearing structures 24 and 25. As indicated, a bearing collar 49 is fixed to the lower portion of the sleeve and this collar is located anti-frictionally between race ways 50 and 51 fixed to the bearing 25. Another anti-friction bearing 52 cooperates with the upper end of the sleeve adjacent to the bearing 24. Fixed to or formed as a part of the upper end of the sleeve is a ratchet wheel 53, and also shown adjacent to the ratchet wheel is a miter gear 54 meshing with a similar gear 55 carried by a horizontal shaft 56 journaled in a bracket 57 on the main frame. By means of a crank (here not shown) fixed to the shaft 56 an operator may rapidly rotate the sleeve for the purpose of causing the runner 46 to move upward to the upper end of the sleeve or as near thereto as may be necessary to elevate the tool spindle so as to bring the tool in proper position to begin the operation. The runner 46 is held from rotation by any suitable means such for example as by being slidably mounted upon a plurality of parallel rods 58 fixed within the sleeve and held in an upper head 59 and a fixed lower member 60.

A pawl 61 is mounted upon an arm 62 extending laterally from an annular member 63 supported upon and movable around the head portion 64 of the bracket. To the outer end of the arm 62 is pivoted a clevis 65 between which and another clevis 66, connected to the lower end of the finger 41, is a link 67. The teeth of the ratchet wheel 53 are so arranged that when the rock shaft 38 is moved in a counter clockwise direction as indicated in Fig. 2, the pawl 61 will ride idly over the teeth and at such time power is being stored in the spring 40. During this idle movement of the pawl the tool 37 is presumed to be returning to the cutting position. When the return stroke of the cutter is completed and the cam 23 passes beyond the tappet 39, the spring 40 acts instantly to throw the finger 41 against the stop 42, drawing with it the pawl 61, which pawl acting on the ratchet-wheel 53 causes it to rotate a distance of one or more teeth causing the downward feed of the runner 46 and shaft 26 just before the next cut starts. As stated above, the stroke of the finger and pawl and the corresponding extent of downward feed of the tool are determined by the adjusting of the stops 42. By providing two projections on the same cam 23 at a distance apart circumferentially of 180°, and at the proper distance axially, provision is made for proper feeding of either right-hand or left-hand cutter, by moving the cam 23 along the shaft until the proper cam comes opposite the tappet 39. As indicated in Fig. 3 the projections from the cam 23 are arranged in different planes to allow for proper setting of the cam to suit the cutter. The same object could be gained by rotating a single cam thru an angle 180°.

Figure 6:
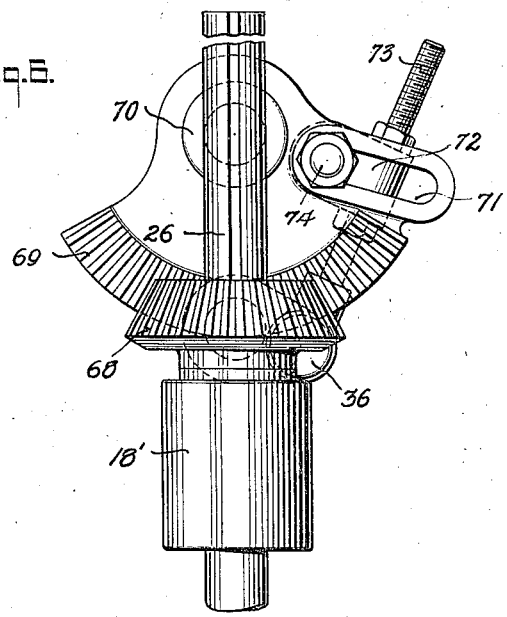
Fig. 6 is a view of the same general nature as Fig. 2, but showing a modification.
Figure 7:
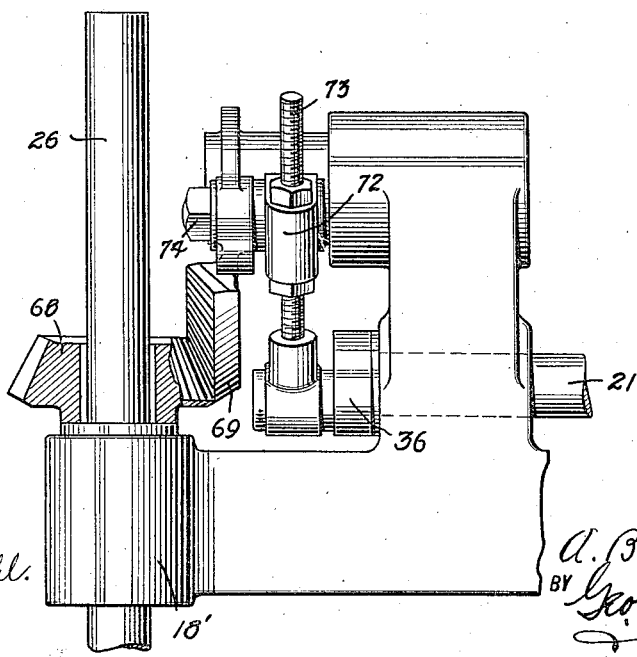
Fig. 7 is a partial side elevation and partial vertical section of the mechanism of Fig. 6.

In Figs. 6 and 7 the bracket 18' is provided with bearings for the power shaft 21 and vertical spindle 26, the same as above described, but in place of the rocking lever mechanism at 29 for oscillating the spindle 26 I provide a pinion 68 splined to the spindle and meshing with a bevel segment 69 hung from a bearing 70 at the top of the bracket. The web portion of the segment 69 is provided with a radial slot 71 in which is mounted for radial adjustment a block 72 through which is adjustably fixed a threaded bolt or rod 73 whose other end is pivoted to the crank 36. The block 72 has free rotation on the connection 74 the axis of which is parallel to the pivot 70. While the shaft 21 is adapted for continuous rotation as already explained the segment 69 will be oscillated around its supporting pivot 70, and the length of the stroke of the segment will be determined by either the adjustment of the pin 74 along the slot 71 or the effective length of the rod 73, or both. It will of course be understood that the feed mechanism above described may be the same irrespective of the particular type of cutting mechanism.

In Figs. 8 to 10 the power actuating means for the cutter spindle 26 includes a spur pinion 68' and a spur segment 69', the latter being mounted upon a vertical pivot 70' on the bracket extension 75. Fixed to the end of the power shaft 21 is a head 76 having a dove tailed groove 77 in which is adjustably fitted a correspondingly shaped block 78 adjustable toward and from the axis of the shaft 21 by means of a screw 79 journaled in the head 76. This head and block constitute a crank, the wrist pin 80 of which has journaled thereon a clevis 81 having a rod connection 82 with another clevis 83 pivoted to the segment 69' or some part rigidly connected therewith. Hence with the rotation of the shaft 21 the spindle 26 and its tool will be given oscillations, the length of arc of which will be determined by the effective length of the crank with respect to the axis of the shaft 21.

I claim:

1. In a metal working machine, the combination of a frame having bearings the axes of which are at an angle to each other, a power member journaled in one of said axes, a cutting member mounted in the other axis, means to actuate the cutting member from the power member, and means to feed the cutting member to the work, the feeding means including a cam mounted on the power member and pawl and ratchet mechanism adjacent to the cutting member.

2. In a metal working machine, the combination of a horizontal power shaft and means to rotate it, a vertical tool spindle, means between the power shaft and the spindle to cause direct oscillations of the spindle from continuous rotation of the power shaft, and means to cause step by step downward feeding of the spindle from the power shaft and including a spring so arranged as to cause the downward feed to be practically instantaneous, the feeding of the spindle resulting from power stored in the spring.

3. A device as set forth in claim 2 in which the spring is coiled around and operates in one direction a rock shaft parallel to the power shaft.

4. A device as set forth in claim 2 in which the spring is coiled around a rock shaft and tends to effect an instantaneous movement of the shaft in one direction for feeding the spindle downward, and adjustable stop means to limit the effective throw of the spring as aforesaid.

5. In a metal working machine, the combination of a tool spindle, means to rotate the spindle for cutting operations, and means to feed the spindle coincident with the aforesaid operation of the spindle, the feeding means including a sleeve surrounding the spindle and having an internal thread, a runner within the sleeve having a peripheral thread cooperating with the sleeve thread, means to attach the spindle to the runner permitting rotation of the spindle, means to hold the runner from rotation, and means to rotate the sleeve.

6. A device as set forth in claim 5 in which the runner is held from rotation by a plurality of parallel rods along which the runner and spindle are adapted to be moved.

7. A device as set forth in claim 5 in which the means to connect the runner to the spindle comprises antifriction bearings allowing free relative rotation between the runner and the spindle, and in which the sleeve is supported antifrictionally for rotation but thereby held from movement endwise.

8. A device as set forth in claim 5 in which a ratchet wheel is carried by the sleeve, a pawl cooperates with the ratchet wheel to impart a step by step movement thereto, the pawl is moved in its idle direction direct from the spindle rotating means against the force of a spring, and in which said spring moves the pawl instantly in its feeding direction after the power is stored therein.

9. A device as set forth in claim 5 in which the sleeve is rotated for normal feeding purposes by a pawl and ratchet mechanism and in which means is provided for the rapid return of the feeding mechanism to its reset position.

10. A device as set forth in claim 5 in which the sleeve is provided with a ratchet wheel and a gear wheel concentric therewith, a means to actuate the ratchet wheel step by step in the feeding direction, and a gear wheel meshing with the aforesaid gear wheel for the rapid rotation of the sleeve in its nonfeeding direction.

In testimony whereof I affix my signature.

ALFRED BONOM.